(12) United States Patent
Nakagawa et al.

(10) Patent No.: US 6,741,802 B1
(45) Date of Patent: May 25, 2004

(54) ELASTIC SUPPORT ASSEMBLY FOR DISK DEVICE FOR DISK RECORDING APPARATUS WITH VIDEO CAMERA

(75) Inventors: Kenzo Nakagawa, Kanagawa (JP); Yoshiaki Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/991,504

(22) Filed: Dec. 16, 1997

(30) Foreign Application Priority Data

Dec. 24, 1996 (JP) .......................... P08-355447

(51) Int. Cl.[7] .......................... H04N 5/225; H04N 5/76; H04N 5/91; H04N 5/781; H04N 5/85; H04N 5/90
(52) U.S. Cl. .................. 386/117; 386/125; 348/207.99
(58) Field of Search ............................. 358/909.1, 906; 348/208, 207.99; 386/117, 128, 126, 125; 369/21, 44.15, 47

(56) References Cited

U.S. PATENT DOCUMENTS

| | | | | |
|---|---|---|---|---|
| 4,475,130 A | * | 10/1984 | Miller et al. ................ 386/125 |
| 4,849,819 A | | 7/1989 | Ishiguro et al. ......... 358/213.13 |
| 4,943,867 A | * | 7/1990 | Suetaka et al. ............. 386/125 |
| 4,967,278 A | * | 10/1990 | Greenbaum ................ 348/232 |
| 5,379,990 A | * | 1/1995 | Ando et al. .................. 267/34 |
| 5,408,451 A | * | 4/1995 | Noda et al. .............. 369/44.15 |
| 5,721,723 A | * | 2/1998 | Uchimaru et al. ....... 369/44.15 |
| 5,757,753 A | * | 5/1998 | Sugano et al. ............. 369/75.1 |
| 5,777,978 A | * | 7/1998 | Ota et al. .................... 369/219 |
| 5,917,795 A | * | 6/1999 | Furukawa et al. ......... 396/77.2 |
| 5,956,314 A | * | 9/1999 | Ishimatsu et al. ........... 369/247 |
| 5,999,406 A | * | 12/1999 | McKain et al. ............. 361/704 |
| 6,039,299 A | * | 3/2000 | Ohnishi et al. ............. 248/562 |
| 6,108,163 A | * | 8/2000 | Boutaghou ............... 360/97.02 |
| 6,167,190 A | * | 12/2000 | Nagasawa .................. 386/111 |

FOREIGN PATENT DOCUMENTS

| | | |
|---|---|---|
| DE | 41 08 307 A1 | 9/1991 |
| EP | 0 271 869 A1 | 6/1988 |
| JP | 57-142078 | 9/1982 |
| JP | 62-266986 | 11/1987 |
| JP | 06-325558 | 11/1994 |
| JP | 8-65619 A | 3/1996 |

OTHER PUBLICATIONS

In re Nelson 40 CCPA 708, 198 F.2d 837, 95 USPQ 82.*
In re JAPIKSE (CCPA) 86 USPQ 70.*

* cited by examiner

Primary Examiner—Thai Tram
Assistant Examiner—Polin Chieu
(74) Attorney, Agent, or Firm—Frommer Lawrence & Haug LLP; William S. Frommer; Matthew K. Ryan

(57) ABSTRACT

A disk recording apparatus in which a marked improvement is achieved in terms of vibration dampening and shock impact resistance on the disk device. In this disk recording apparatus, a built-in disk device is elastically supported by a plurality of insulators, and the feeding direction of a carriage feeding mechanism for an optical disk and an optical pick-up of the disk device is substantially parallel to the optical axis of a photographic lens.

13 Claims, 13 Drawing Sheets

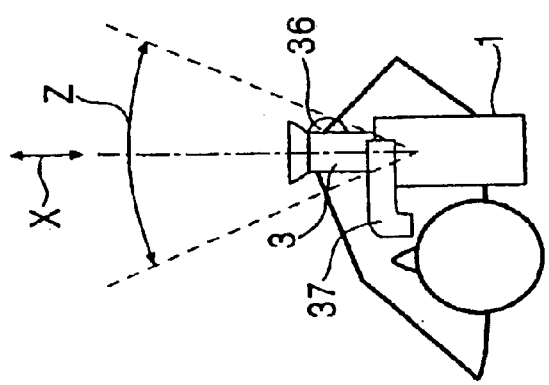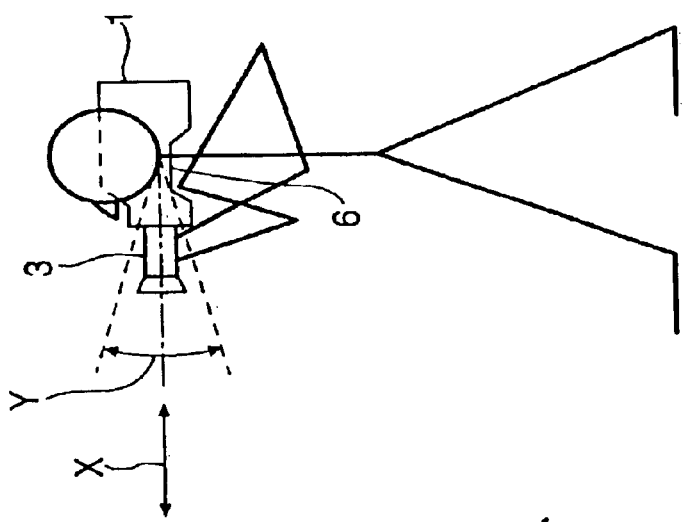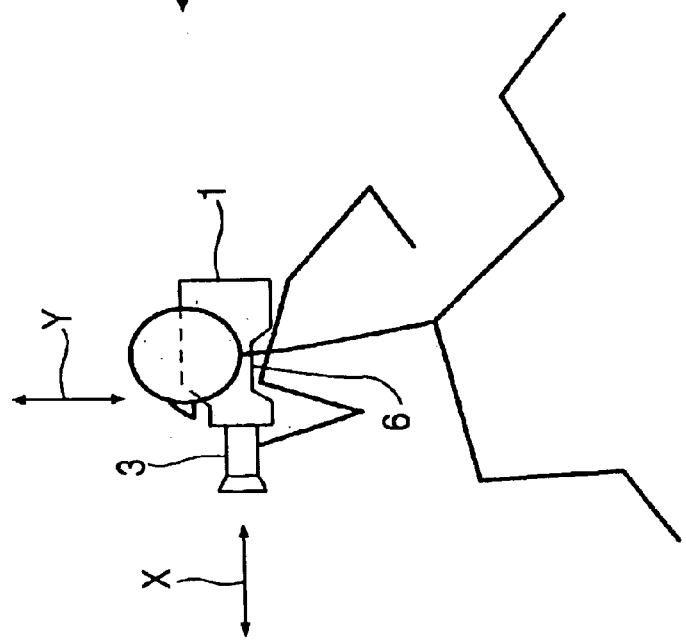

ELASTIC SUPPORT ASSEMBLY FOR DISK DEVICE FOR DISK RECORDING APPARATUS WITH VIDEO CAMERA

BACKGROUND OF THE INVENTION

1. Field of the Invention

The present invention relates to a combination camera/video-recorder system, which has a built-in recording apparatus for recording image information taken and which is referred to as a "video-cam-corder".

2. Description of the Related Art

In a conventional combination camera/video-recorder system (hereinafter referred to as a "video-cam-corder"), image information taken is recorded on the magnetic tape of a built-in video tape recorder and reproduced therefrom. This video tape recorder is resistant to vibrations, so that it is suitable, in particular, for use in video recording under harsh conditions, as in the case of gathering news material by using a broadcasting/business-application portable video-cam-corder. However, since the video tape recorder does not allow high-speed access to the image information recorded on the magnetic tape, the image information cannot be quickly recorded, edited, transferred, etc. In view of this, there has recently been developed a video-cam-corder in which the video camera has a built-in disk device using a so-called optical disk, such as an optic disk or a magneto-optic disk, and image information taken is recorded on and reproduced from the optical disk. Examples of such a video-cam-corder have been proposed by the present inventor (See, for example, Japanese Patent Laid-Open No. 8-65619). Such a disk device is advantageous in that image information can be quickly recorded, edited, transferred, etc. since the image information recorded on the optical disk can be quickly accessed.

The disk device, however, has a problem in that it is less resistant to vibrations than a video tape recorder; when vibrations, impacts, etc. are applied to the device during video recording to cause deviation in the tracking of the laser beam being focused on the optical disk, the image information recorded will be destroyed. In view of this, in the above-mentioned examples proposed by the present inventor, an improvement is achieved in terms of the vibration-proofness of the disk device contained in the video camera. However, there is a demand for further improvement in vibration-proofness, impact-proofness, etc.

SUMMARY OF THE INVENTION

The present invention has been made with a view toward solving the above problem in the prior art. It is an object of the present invention to provide a combination camera/video-recorder system in which it is possible to achieve a marked improvement in terms of the vibration-proofness, impact-proofness, etc. of the built-in disk device.

To achieve the above object, there is provided, in accordance with the present invention, a combination camera/video-recorder system wherein the disk device is elastically supported by a plurality of insulators and wherein both the disk recording medium feeding direction and the pick-up feeding direction are arranged substantially parallel to the optical axis of the photographic lens, whereby it is possible to achieve a marked improvement in terms of the vibration-proofness, impact-proofness, etc. of the disk device.

BRIEF DESCRIPTION OF THE DRAWINGS

FIGS. 12A through 12C are diagrams illustrating video recording attitudes for a video-cam-corder;

DESCRIPTION OF THE PREFERRED EMBODIMENTS

A video-cam-corder in accordance with an embodiment of the present invention will now be described in detail with reference to the drawings.

[Outline of Video-Cam-Corder]

Figure 1:
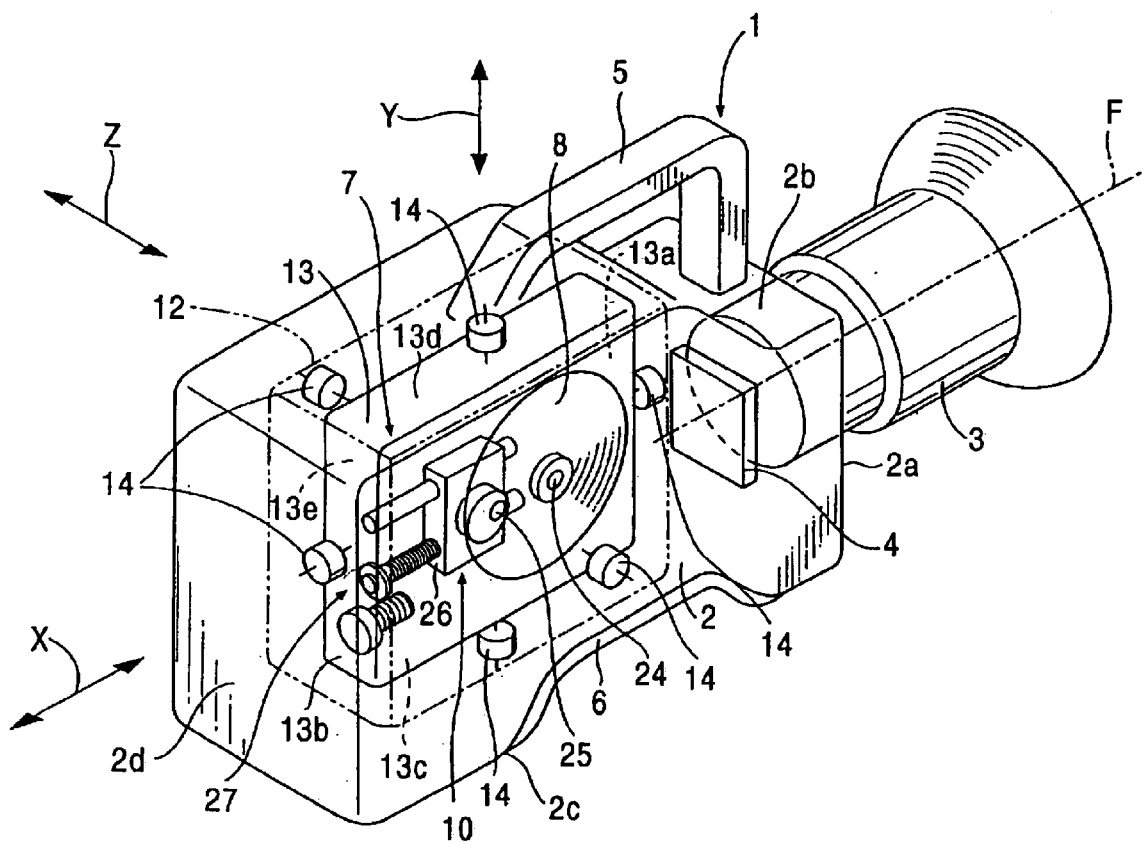
FIG. 1 is a general perspective view illustrating a video-cam-corder according to an embodiment of the present invention.
Figure 2:
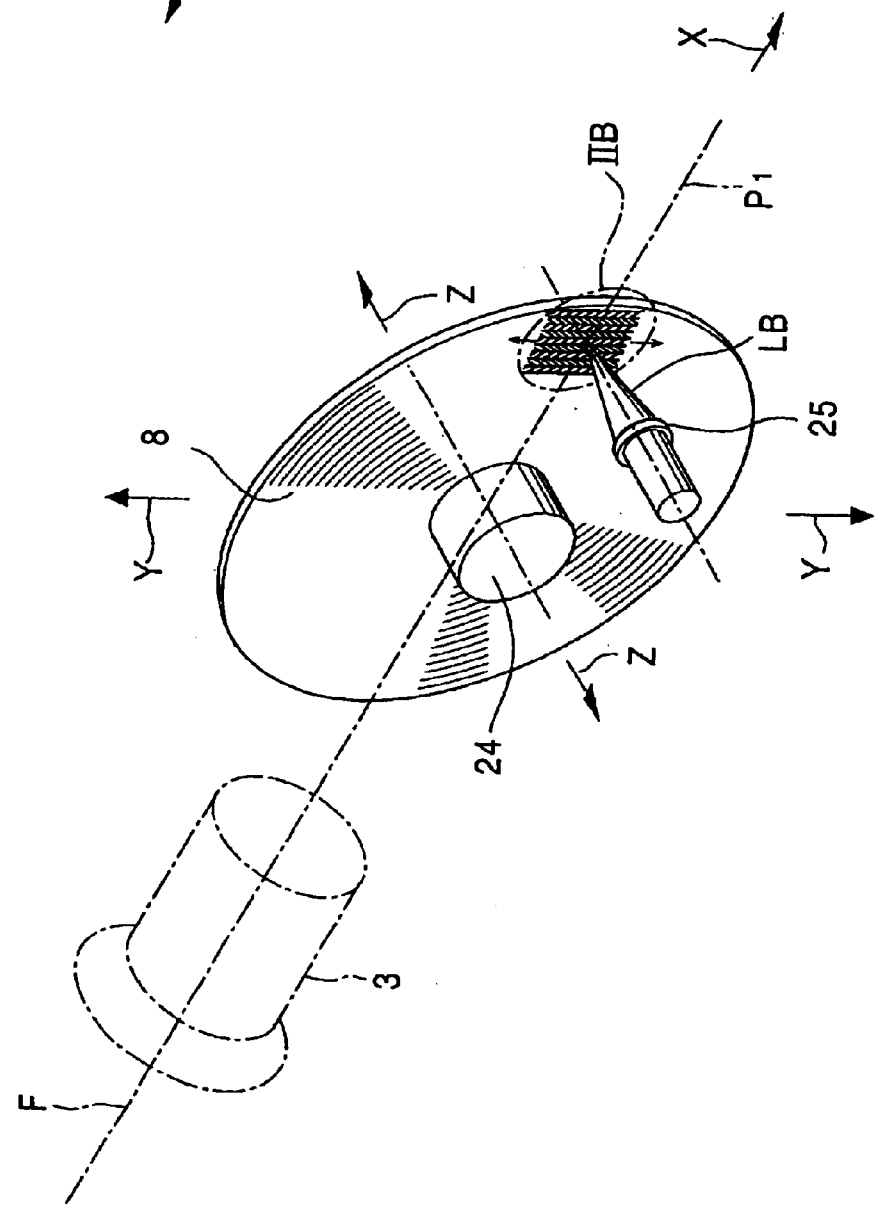
FIG. 2 is a perspective view showing that the optical disk and the feeding direction thereof are parallel to the optical axis.
Figure 3:
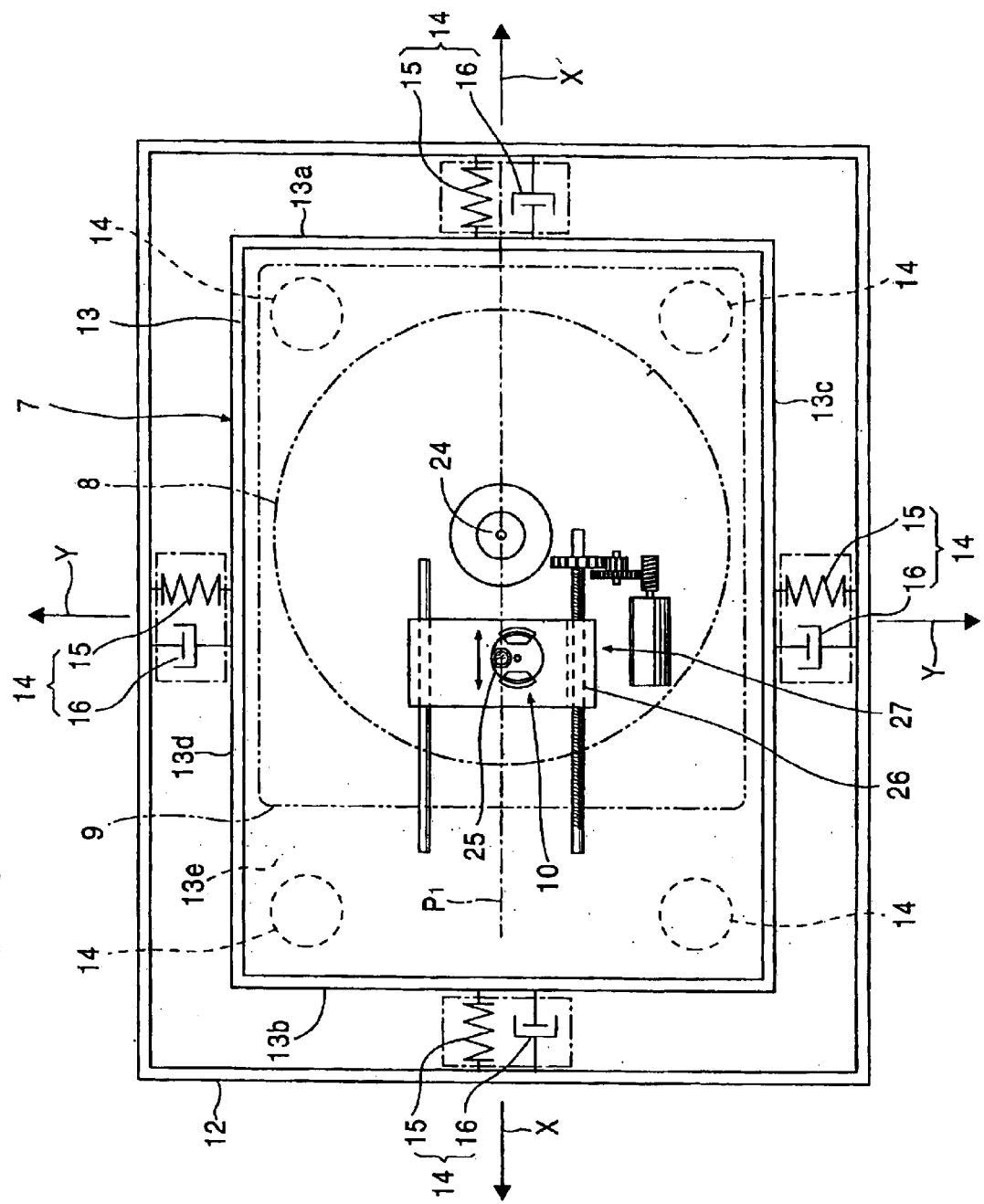
FIG. 3 is a schematic side view showing insulators elastically supporting the built-in disk device.

First, the outline of a video-cam-corder will be described. As shown in FIGS. 1 through 3, this video-cam-recorder, indicated by numeral 1, includes a camera main body 2, to the front side 2a of which a photographic lens 3 is mounted. Inside the camera main body 2, there is provided an imaging apparatus 4 comprising a CCD or the like and arranged in the optical axis F of the photographic lens 3. This imaging device 4 generates image information from an optical image supplied through the photographic lens 3. A grip 5 for handling the camera is attached to the upper portion 2b of the camera main body 2, and a shoulder pad 6 is attached to the lower side 2c of the camera main body 2. To the rear side 2d of the camera main body 2, a battery, a power source cord, etc. (which are not shown) are detachably mounted as needed. In this video-cam-corder 1, a disk device 7 is used as the image information recording device. The disk device 7 is contained in the camera main body 2 or in an adaptor (not shown) which is detachably mounted to the rear side 2d of the camera main body 2 (Hereinafter, only the case will be described in which the disk device 7 is contained in the camera main body 2). In the disk device 7, a so-called optical disk 8, comprising an optic disk or a magneto-optic disk, is mounted uncovered or in a state in which it is accommodated in a disk cartridge 9. The disk device 7 is equipped with an optical pick-up 10 serving as the pick-up (head) for recording and reproducing image information on and from the optical disk 8.

Thus, in this video-cam-corder 1, image information (image signal) obtained by the imaging device 4 is recorded on and reproduced from the optical disk 8 of the built-in disk device 7 by means of the optical pick-up 10. This disk device 7 is compact. Further, a digital signal processing method is adopted, in which image information is recorded on the optical disk by means of a digital signal, so that the recording capacity of the optical disk 8 is remarkably large. Further, in this disk device 7, image information is recorded on and reproduced from the optical disk 8 by means of the optical pick-up 10, so that the recorded image information can be quickly accessed; the photographed image information can be quickly recorded, edited, transferred, etc. Thus, the video-cam-corder is most suitable, in particular, for broadcasting and business applications.

[Insulator]

Next, a plurality of insulators, which are mounted in the camera main body 2 so as to elastically support the disk device 7, will be described. As shown in FIGS. 1 through 3, inside the camera main body 2, there is arranged a vertical camera main body chassis 12, which is in the form of a casing having one side open. The disk device 7 is accommodated in the camera main body chassis 12 in an upright (vertical) position. Inside the camera main body chassis 12, there is provided a disk device chassis 13 whose outer periphery is elastically supported by a plurality of insulators 14 in the longitudinal direction X, the vertical direction Y, and the lateral direction Z. In many of these insulators 14, a spring element 15 and a dashpot element 16 are incorporated.

That is, the load of the disk device chassis 13 is directly applied to the plurality of insulators 14, which support the front and rear sides 13a and 13b, the lower side 13c and one side surface 13e of the disk device chassis 13. In view of this, as shown, for example, in FIG. 4, each of these insulators 14 is composed of a coil spring 17 constituting the spring element 15 and an elastic member 18 comprising rubber or the like constituting the dashpot element 16.

Figure 4:
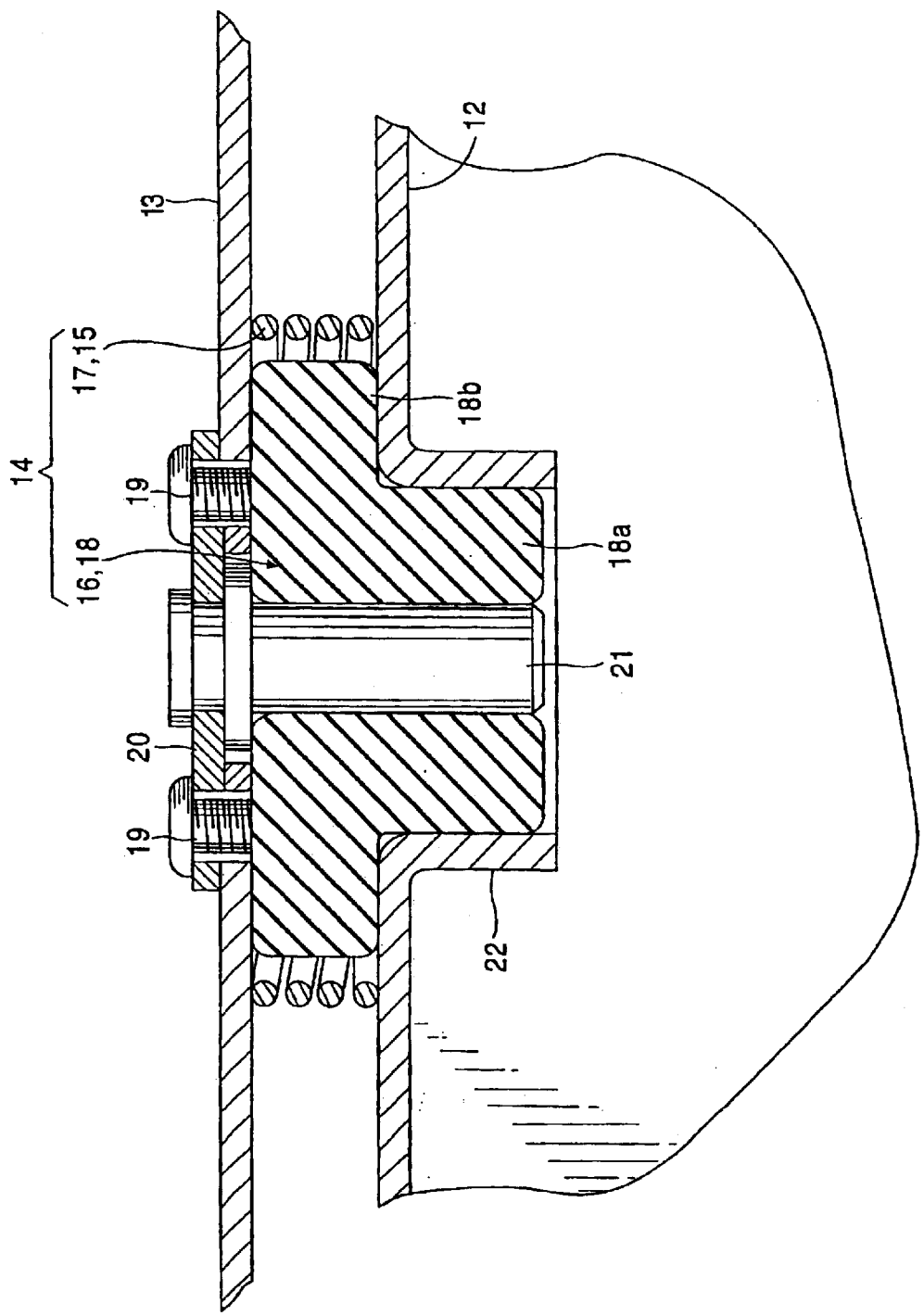
FIG. 4 is a sectional side view illustrating a concrete example of the spring element and the dashpot element of the insulator.

In FIG. 4, a pin mounting plate 20 is attached to the disk device chassis 13 by a pair of fastening screws 19, and a central pin 21 is inserted through the center of the pin mounting plate 20 and fixed thereto by screwing, crimping, etc. The outer periphery of the central pin 21 is surrounded by the cylindrical elastic member 18, which is fitted into a cylindrical portion 22 integrally formed in the camera main body chassis 12 by burring or the like. Initial compressive stress is applied to the elastic member 18 when it is fitted into the cylindrical portion 22. The coil spring 17 is arranged around a flange portion 18b of the elastic member 18 and between the camera main body chassis 12 and the disk device chassis 13, with initial compressive stress being applied to the coil spring 17. By sealing a liquid in the elastic member 18, the coil spring 17 could be omitted.

Figure 5:
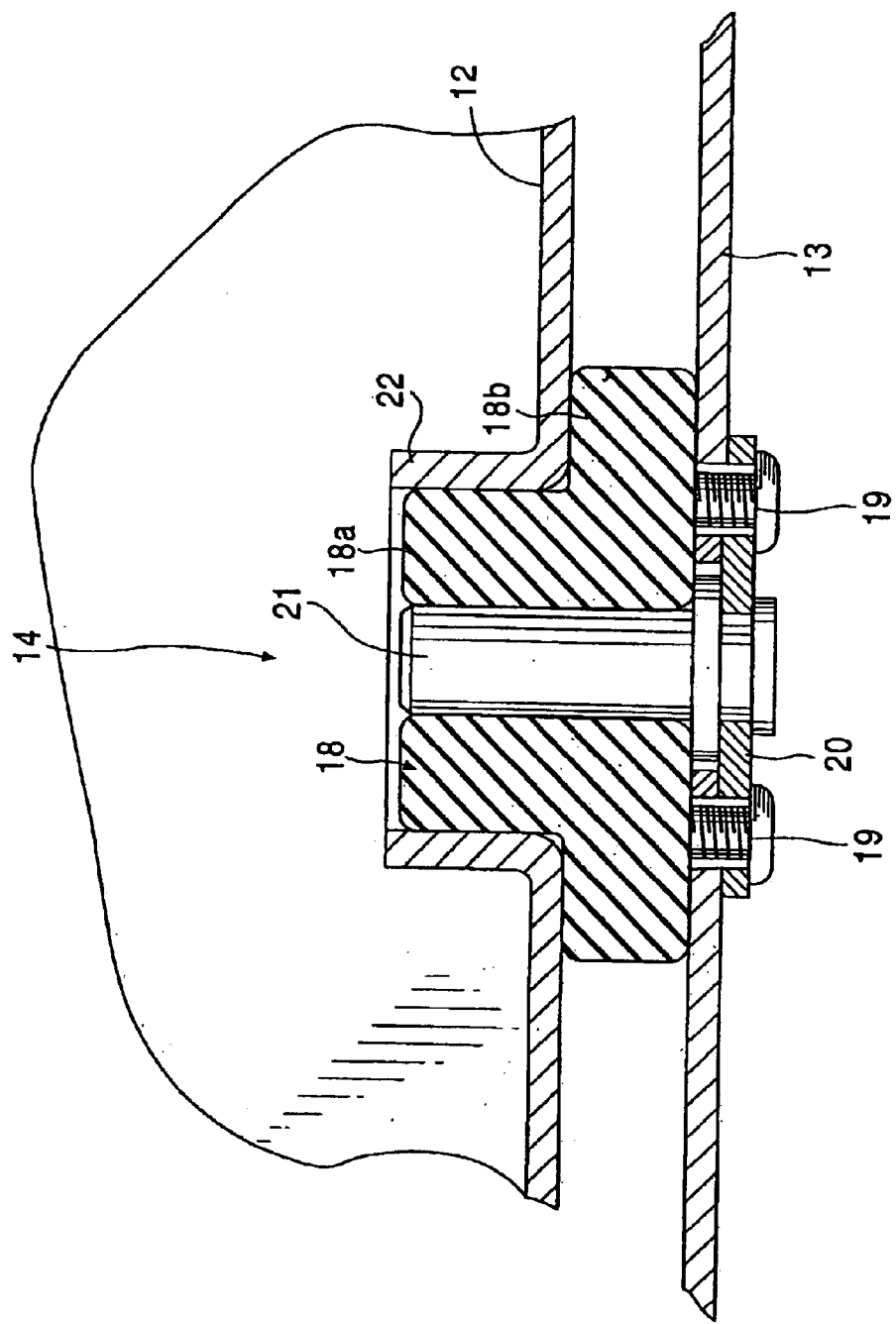
FIG. 5 is a sectional side view showing a concrete example of a simplified-type insulator.

Usually, the load of the disk device chassis 13 is not directly applied to those insulators 14 which support the upper side 13d of the disk device chassis 13. Thus, these insulators may be a simplified type in which either the spring element 15 or the dashpot element 16 is omitted, as shown in FIG. 5. In FIG. 5, only the elastic member 18 is used, and the coil spring 17 is omitted. The elastic member 18 is supported by the central pin 21 shown in FIG. 4.

Due to the plurality of insulators 14, constructed as described above, any external vibration or impact applied to the camera main body chassis 12 can be quickly absorbed and attenuated by the spring elements 15 and the dashpot elements 16. Thus, a very high level of shock absorbing ability can be obtained. Due to this effect, any external vibration or impact is not easily transmitted to the disk device chassis 13, whereby the vibration-proofness and the impact-proofness of the disk device 7 can be remarkably improved.

[Outline of Disk Device]

Figure 11:
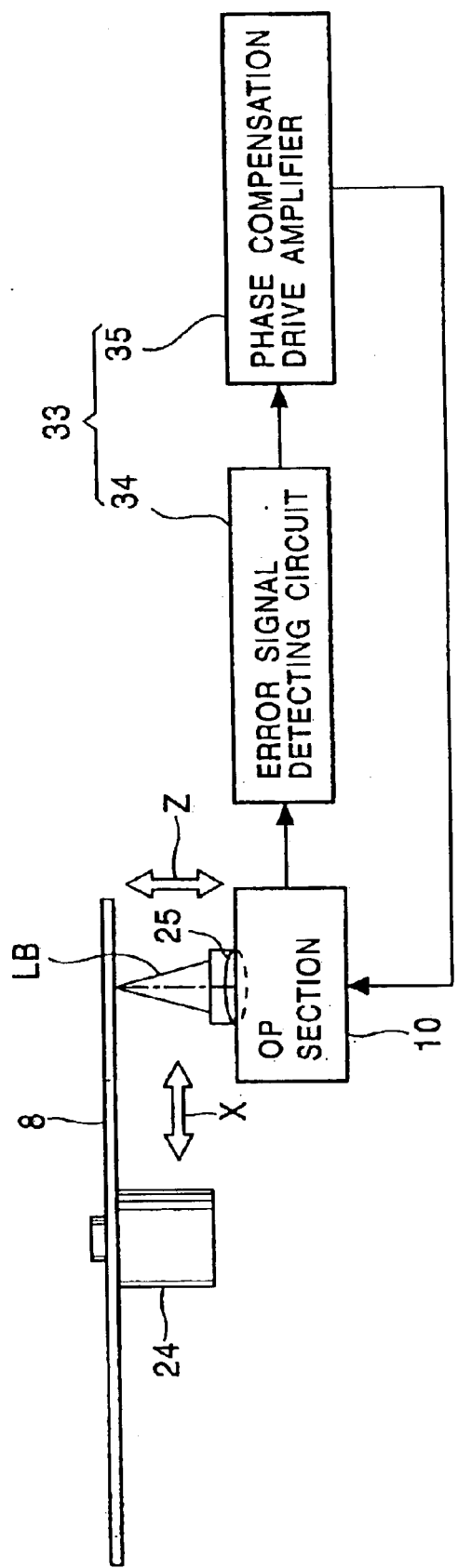
FIG. 11 is a diagram illustrating the servo circuit of the optical pick-up.

Next, the outline of the disk device 7 will be described. As shown in FIGS. 1 through 3, the disk device 7 has a spindle motor 24, to which the optical disk 8 is attached at right angles and which is driven to rotate. The optical pick-up 10 has a carriage 26 to which an objective lens 25 is mounted. There is provided a carriage feeding mechanism 27 which moves the objective lens 25, mounted to the carriage 26, along a radial line extending from the center of the optical disk 8. As shown in FIG. 11, the optical disk 8 is rotated at high speed by the spindle motor 24, and the spot of a laser beam LB is applied at right angles to the optical disk 8 by the objective lens 25 of the optical pick-up 10. The objective lens 25 is moved parallel to the optical disk 8 along with the carriage 26 by means of the carriage feeding mechanism 27, whereby image information is recorded on or reproduced from the optical disk 8 while effecting tracking of the spot of the laser beam LB along the radial line extending from the center of the optical disk 8.

Figure 10:
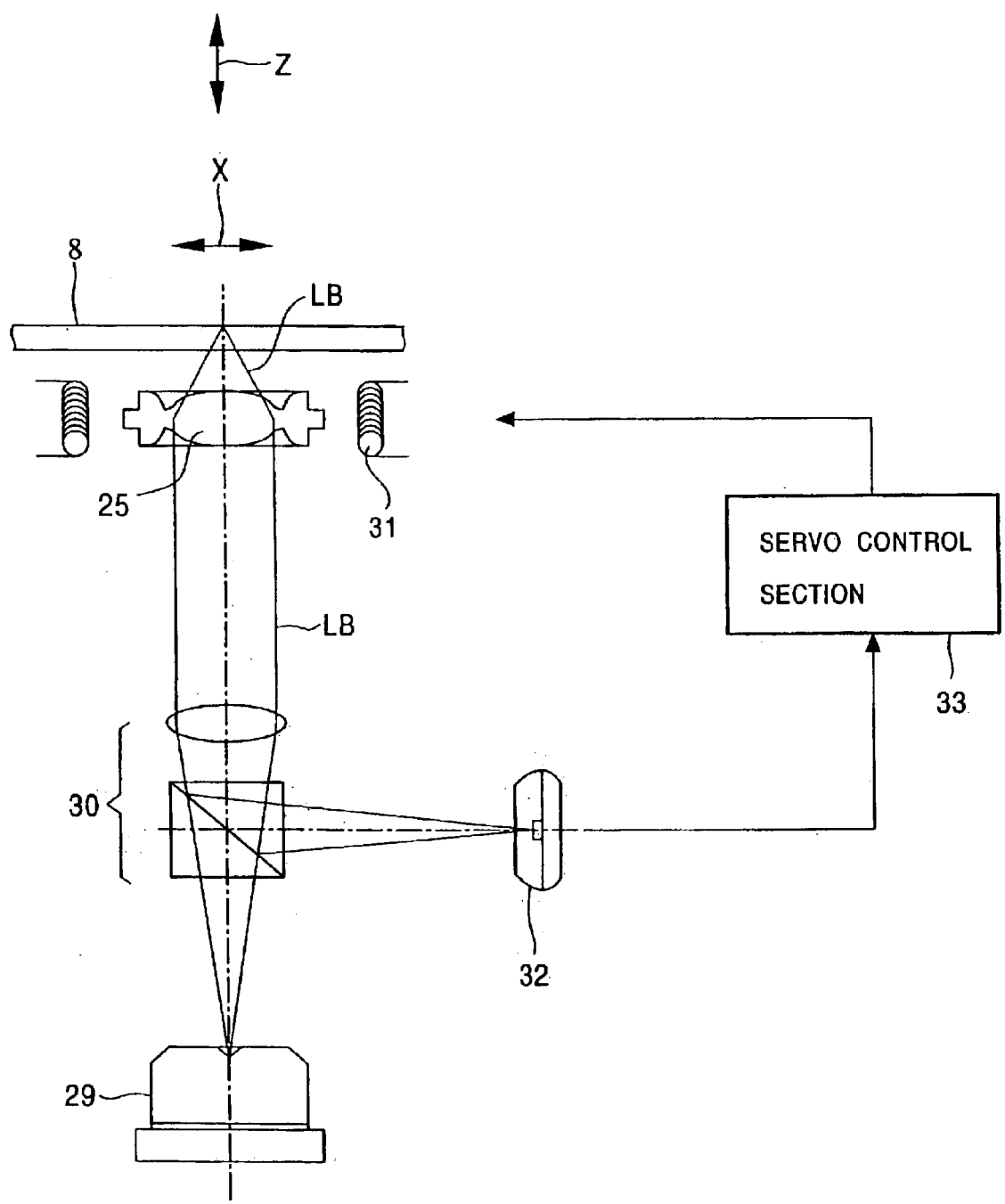
FIG. 10 is a diagram illustrating an optical pick-up.

In this process, as shown in FIG. 10, the laser beam LB, which is emitted from a semiconductor laser 29, is applied to the objective lens 25 through an optical system 30, and, due to the objective lens 25, the spot of the laser beam LB is applied at right angles to the optical disk 8. The objective lens 25 is driven in the focusing direction (the Z-direction) and the tracking direction (the X-direction) by a biaxial actuator 31 mounted on the carriage 26, whereby focusing adjustment and tracking adjustment of the spot of the laser beam LB are effected with respect to the optical disk 8. In this process, the reflection beam of the laser beam LB reflected by the optical disk 8 is received by a light receiving element 32 comprising a photodiode or the like through the optical system 30, and the biaxial actuator 31 is controlled by a servo circuit 33, whereby the focusing adjustment and the tracking adjustment of the spot of the laser beam LB can be effected instantaneously. More specifically, as shown in FIG. 11, in the servo circuit 33, an error signal detecting circuit 34 detects any error in focusing and tracking, and a phase compensation drive amplifier 35 drives the biaxial actuator 31.

[Arrangement of Optical Disk and Carriage Feeding Mechanism]

Next, the optical disk 8 and the direction in which the objective lens 25 is fed by the feeding mechanism 27 will be described. As shown in FIGS. 1 through 3, the optical disk 8 of the disk device 7, accommodated in the camera main body 2, is attached at right angles to the spindle motor 24 and arranged parallel to the optical axis F of the photographic lens 3. That is, the optical disk 8 is rotated in a plane which is parallel to the optical axis F and which is vertical (i.e., perpendicular to the ground). The objective lens 25 is constructed such that it applies the spot of the laser beam LB at right angles to the optical disk 8 in a horizontal reference line P1, which is a radial line extending from the center of the optical disk 8 and which is parallel to the optical axis F. The objective lens 25 is fed by the carriage feeding mechanism 27 in the direction parallel to the optical axis F, which is the longitudinal direction, i.e., the direction X, of the camera main body 2.

Thus, as shown in FIG. 2, in this disk device 7, while rotating the optical disk 8 at high speed in a vertical plane by the spindle motor 24, the spot of the laser beam LB is applied to the optical disk 8 in a direction parallel to the Z-direction, which is the lateral horizontal direction, and focused on the horizontal reference line P1 of the optical disk 8. Then, by translating the objective lens 25 in the longitudinal direction X by the feeding mechanism 27, image information is recorded or reproduced on or from the optical disk 8 while performing tracking with the spot of the laser beam LB along the horizontal reference line P1 in the longitudinal direction X. Thus, when locally observed, the recording track TR for recording on the horizontal reference line P1 of the optical disk 8 by the spot of the laser beam LB, is in the vertical direction Y, which is along a vertical reference line P2 that is perpendicular to the horizontal reference line P1. However, the focusing of the spot of the laser beam LB is effected in the Z-direction.

As shown in FIGS. 12A through 12C, when performing video recording by using this video-cam-corder 1, the cameraman places the camera main body 2 on his shoulder through the intermediation of the shoulder pad 6, and holds a lens grip 36 provided on the side of the photographic lens 3 with, for example, his right hand, viewing through a view finder 37 with, for example, his right eye. When video recording is performed while walking or running as shown in FIG. 12A, a great vibration, impact, etc. in the vertical direction Y due to gravitational acceleration are generated in the video-cam-corder 1. When the video-cam-corder is tilted as shown in FIG. 12B, a slight vibration, impact, etc. in the vertical direction Y and the longitudinal direction X due to gravitational acceleration, centrifugal force, etc. are generated. When the video-cam-corder is panned as shown in FIG. 12C, a slight vibration, impact, etc. in the horizontal direction Z and the longitudinal direction X due to gravitational acceleration, centrifugal force, etc. are generated.

However, as described with reference to FIG. 2, the recording track TR on the horizontal reference line P1 of the optical disk 8 is in the vertical direction Y, so that, even when a great vibration, impact, etc. in the vertical direction Y are generated during video recording, the spot of the laser beam LB only oscillates vertically along the recording track TR, and there is generated substantially no track deviation of the spot of the laser beam LB. This provides, together with the above-mentioned shock absorbing ability due to the plurality of insulators 14, an exceptional advantage in terms of tracking, that is, a very high level of vibration-proofness and impact-proofness. As to the slight vibrations, impacts, etc. in the longitudinal direction X and the horizontal direction Z generated during video recording, almost all of them can be absorbed by the plurality of insulators 14, and well handled within the capacity of the above-described biaxial actuator 31 for focusing adjustment and tracking adjustment.

[Feeding Mechanism]

Figure 6:
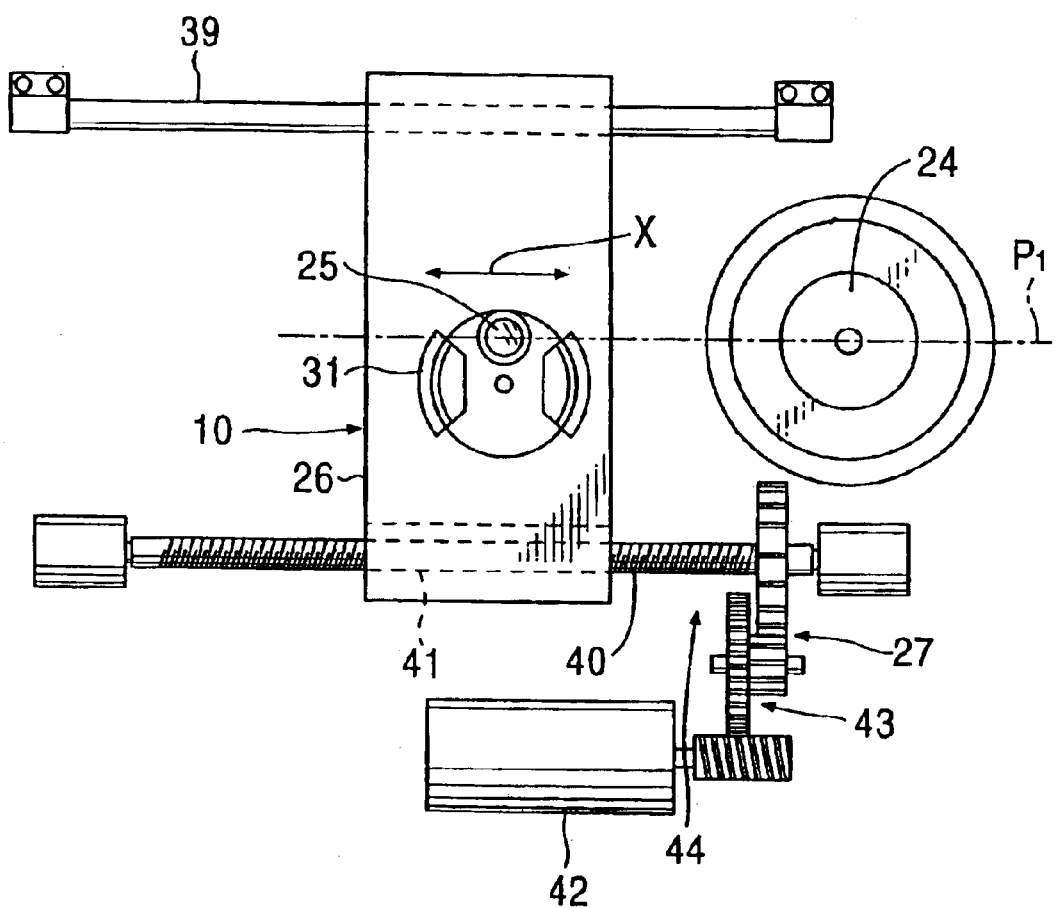
FIG. 6 is a side view illustrating the screw feeding structure of a carriage feeding mechanism.
Figure 7:
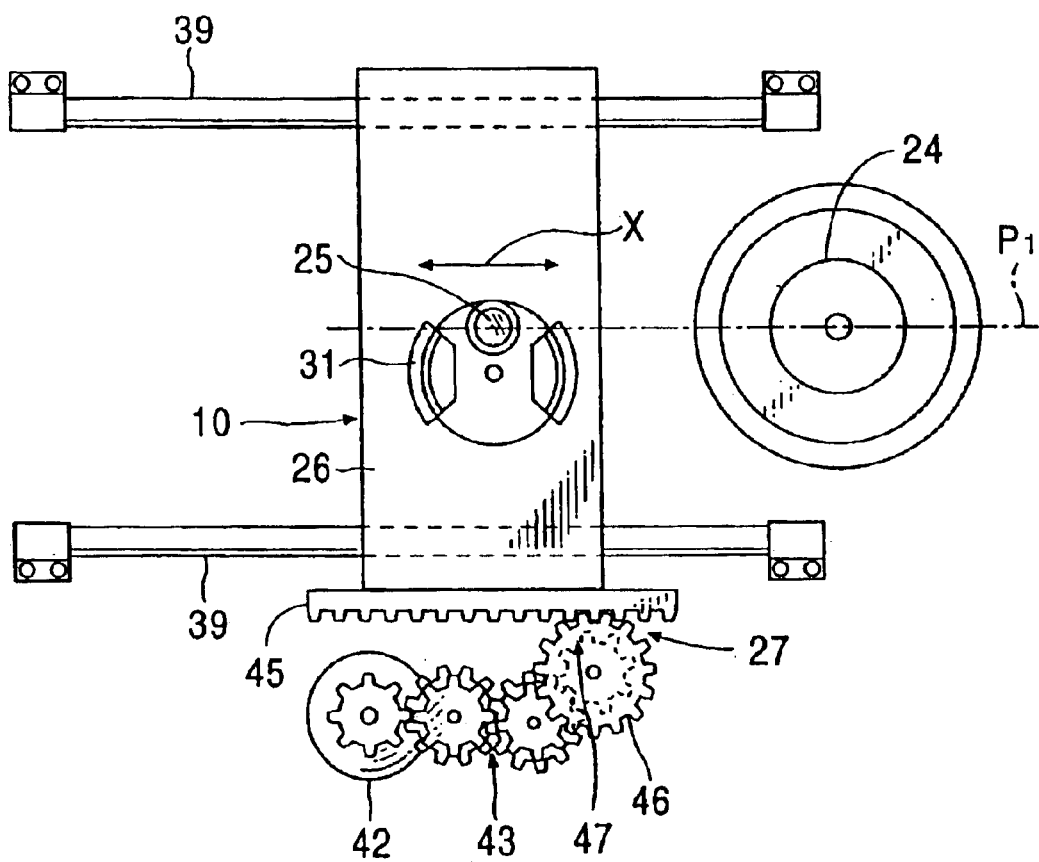
FIG. 7 is a side sectional view illustrating the rack-pinion structure of the carriage feeding mechanism.

Next, the carriage feeding mechanism 27 will be described. As shown in FIGS. 6 and 7, in this carriage feeding mechanism 27, the objective lens 25 is transferred by the carriage 26 along the horizontal reference line P1 of the optical disk 8, that is, in the longitudinal direction X, which is parallel to the optical axis F. The carriage 26, which is guided on a guide shaft 39 that is parallel to the optical axis F, is driven by a motor in the X-direction on the guide shaft 39. Regarding the motor, it might be possible to adopt a linear motor which drives the carriage 26 in a non-contact state by using a magnetic circuit. However, to prevent as much as possible track deviation of the spot of the laser beam LB due to the slight vibrations, impacts, etc. generated during video recording, it is desirable to adopt a carriage feeding mechanism 27 described below.

The carriage feeding mechanism 27 shown in FIG. 6 adopts a screw feeding mechanism 44, in which the carriage 26 is threadedly connected to a feeding screw 40 which is parallel to the guide shaft 39 through the intermediation of a nut 41; the feeding screw 40 is rotated in the normal and reverse directions by a DC motor 42 through a gear train 43, whereby the carriage 26 is screw-fed in the X-direction along the guide shaft 39. The carriage feeding mechanism 27 shown in FIG. 7 adopts a rack/pinion mechanism 47, in which the carriage 26 is guided by a pair of parallel guide shafts 39 and in which a rack 45 that is parallel to the guide shafts 39 is attached to the carriage 26. A pinion 46 that is in mesh with the rack 45 is rotated in the normal and reverse directions by the DC motor 42 through the gear train 43, whereby the carriage 26 is translated in the X-direction along the guide shafts 39 through the intermediation of the rack 45. The screw feeding mechanism 44 and the rack/pinion mechanism 47, described above, have a contact structure in which the DC motor 42 and the carriage 26 are mechanically connected to each other.

Figure 13:
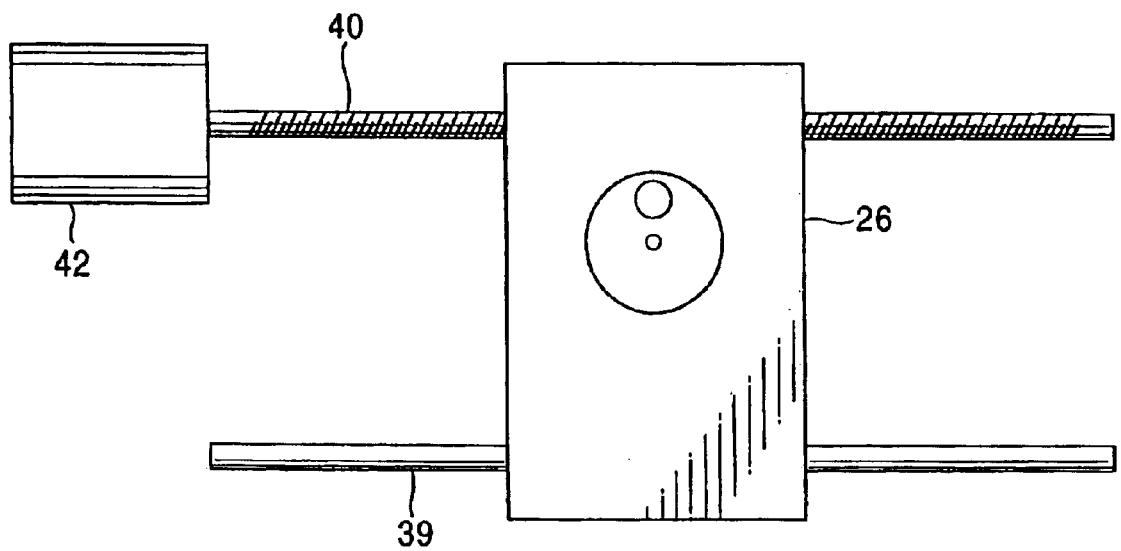
FIG. 13 is a side view illustrating the screw feeding structure of the carriage feeding mechanism.
Figure 14:
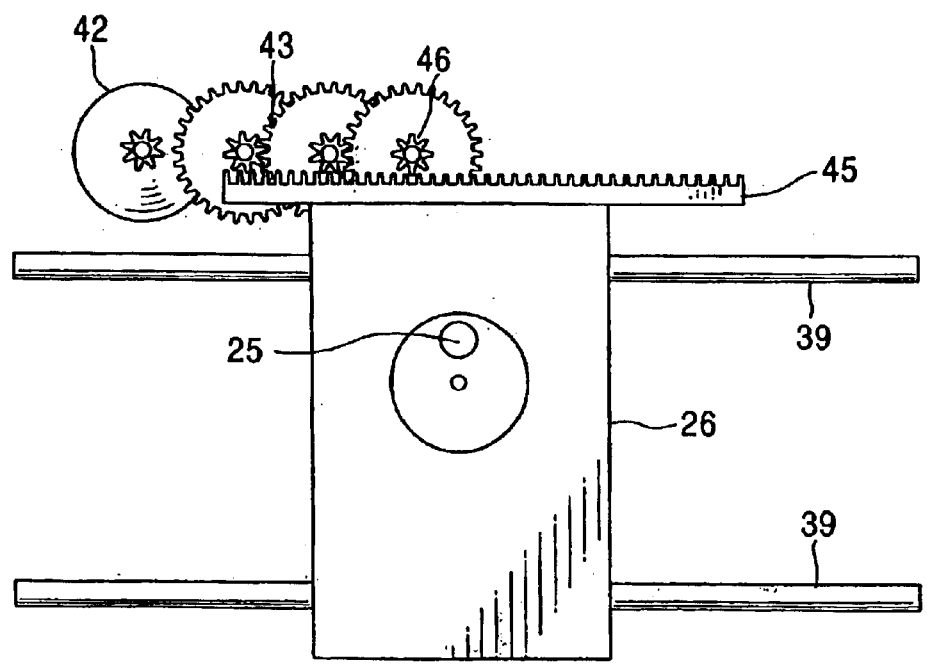
FIG. 14 is a side view illustrating the rack-pinion structure of the carriage feeding mechanism.

Further, as shown in FIG. 13, it is also possible to provide the feeding screw 40 on the upper side and the guide shaft 39 on the lower side, or, as shown in FIG. 14, to provide the rack 45 on the upper side of the carriage 26.

[Biaxial Actuator]

Figure 8:
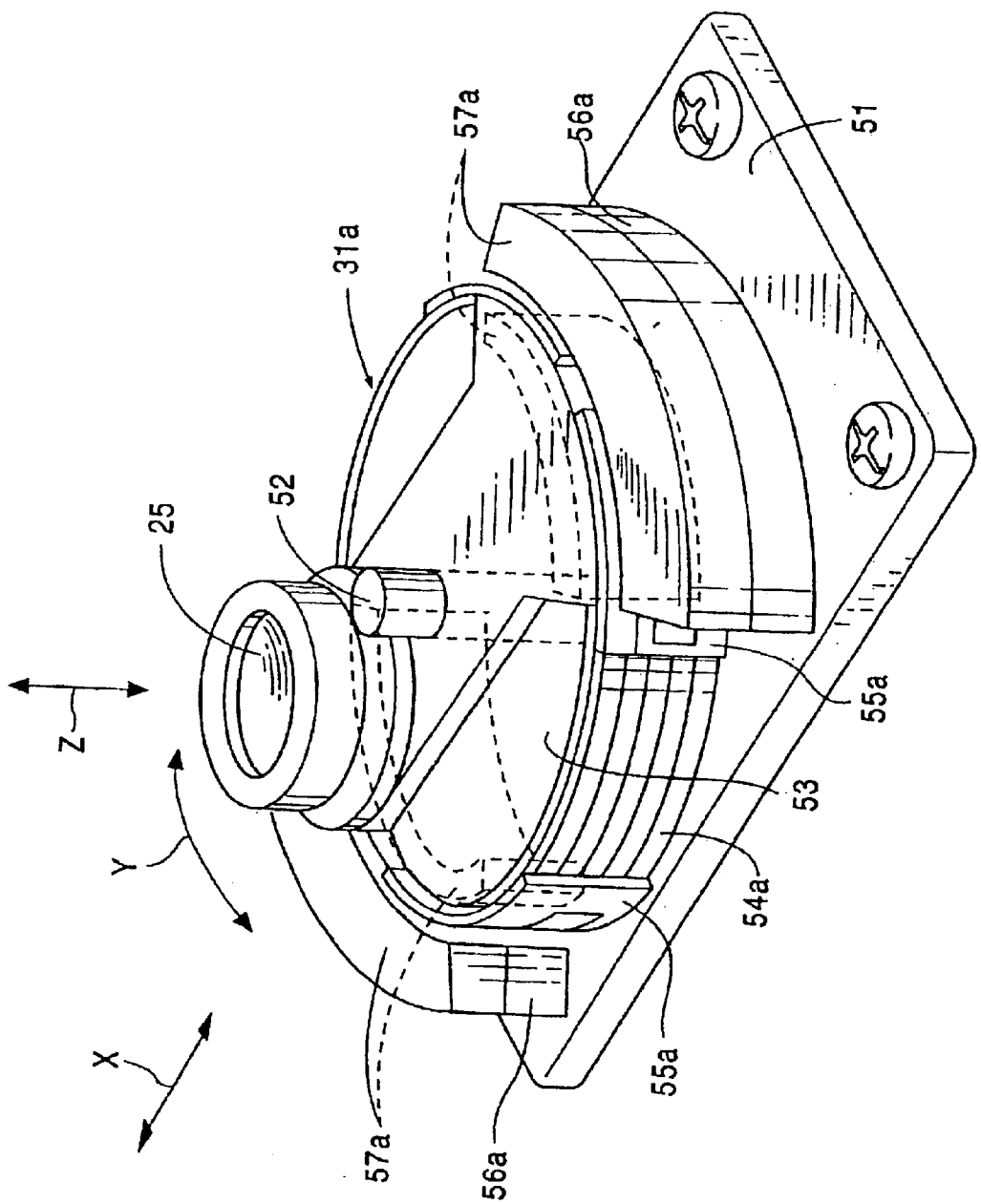
FIG. 8 is a perspective view showing a balanced-type biaxial actuator.

Next, the biaxial actuator 31 mounted on the carriage 26 will be described. To prevent as much as possible oscillation of the objective lens 25 due to the vibrations, impact, etc. generated during video recording, it is desirable to use a balanced type (shaft slide type) biaxial actuator as shown in FIG. 8. In this balanced type biaxial actuator 31a, a shaft 52 is fastened to a base yoke 51 so as to be parallel to the lateral direction, i.e., the Z-direction, and a round bobbin 53, to which the objective lens 25 is fixed at an eccentric position, is mounted so as to be slidable on the shaft 52 in the lateral direction, i.e., the Z-direction, and rotatable in the longitudinal direction, i.e., the X-direction. A focusing coil 54a and tracking coils 55a are attached to the outer periphery of the bobbin 53, and magnets 56a and yokes 57a are fastened to the base yoke 51 so as be arranged in an arcuate form on either side of the bobbin 53, whereby a magnetic circuit is formed. By virtue of this magnetic circuit, focusing adjustment of the objective lens 25 is effected integrally with the bobbin 53 in the lateral direction, i.e., the Z-direction, along the shaft 52, and tracking adjustment of the objective lens 25 is effected in the longitudinal direction, i.e., the X-direction, around the shaft 52. Thus, this balanced type biaxial actuator 31a is strong with respect to all the directions. In particular, vibrations, impacts, etc. in all the directions, i.e., the vertical direction Y, the longitudinal direction X, and the lateral direction Z, can be received by the shaft 52, whereby a marked improvement can be achieved in terms of vibration-proofness and impact-proofness.

Figure 9:
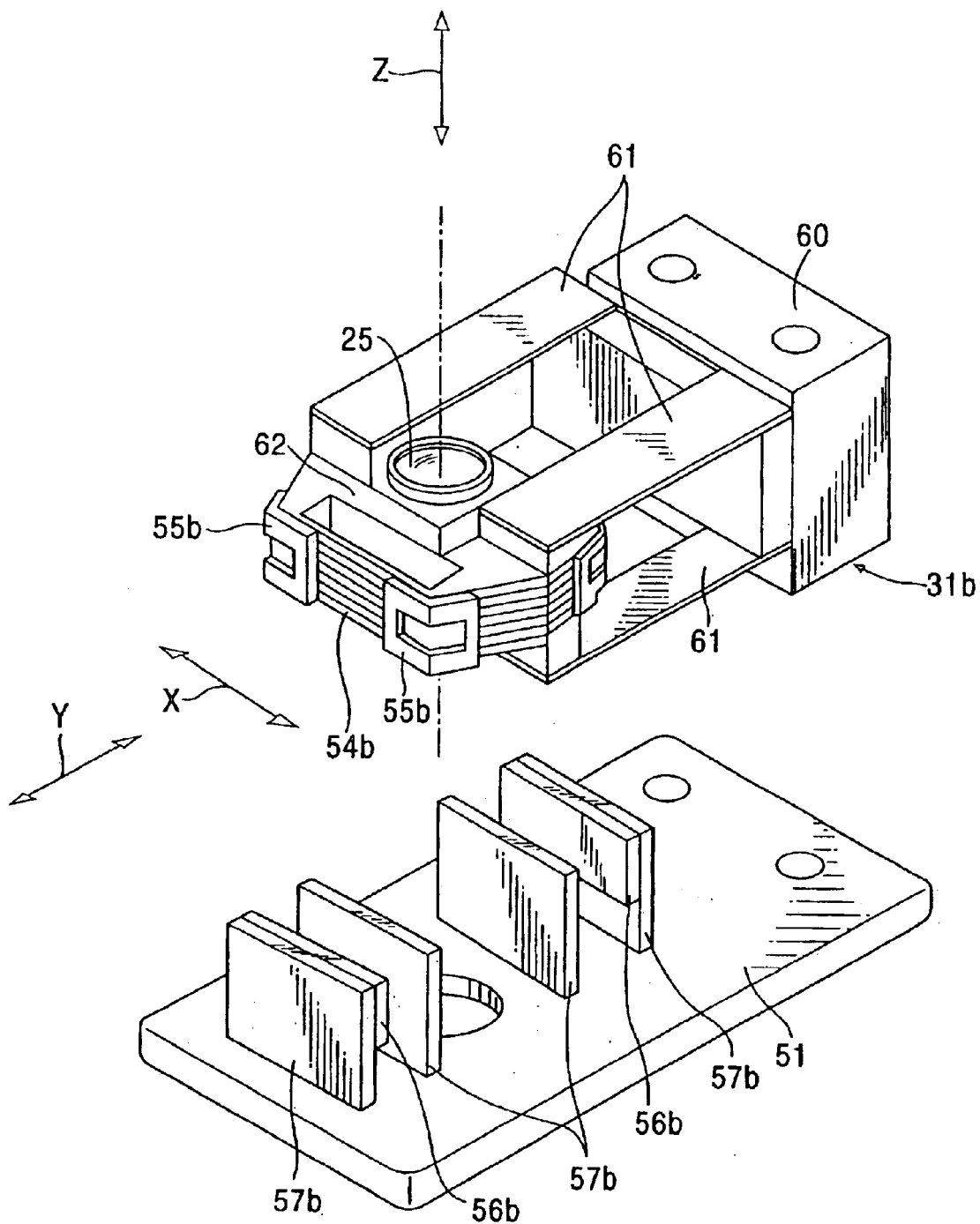
FIG. 9 is an exploded perspective view showing an unbalanced-type biaxial actuator.

FIG. 9 shows an unbalanced type (leaf spring type) biaxial actuator 31b. In this unbalanced type biaxial actuator, a block 60 is fastened to one end of a base yoke 51 by means of screws or the like. Four parallel leaf springs 61 form a quadruple link mechanism, and one end of each of these leaf springs 61 is fastened to the block 60. The other ends of these leaf springs 61 are fastened to a bobbin 62, and the objective lens 25 is secured at the central position of the bobbin 62. A focusing coil 54b and tracking coils 55b are attached to the outer periphery of the bobbin 62, and magnets 56b and yokes 57b are fastened to the base yoke 51 arranged on either side of the bobbin 62, whereby a magnetic circuit is formed. By virtue of this magnetic circuit, focusing adjustment of the objective lens 25 is effected integrally with the bobbin 62 in the lateral direction Z while utilizing the deflection of the parallel leaf springs 61, and tracking adjustment of the objective lens 25 is effected in the longitudinal direction X. Thus, this unbalanced type biaxial actuator 31b is strong only in the longitudinal direction of the parallel leaf springs 61. However, by matching the longitudinal direction of the parallel leaf springs 61 with the vertical direction Y, it is possible to receive vibrations, impacts, etc. in the vertical direction Y by the parallel leaf springs 61. Thus, this unbalanced type biaxial actuator 31b also makes it possible to achieve an improvement in vibration-proofness and impact-proofness.

While the present invention has been described with reference to an embodiment of a combination camera/video-recorder system, the present invention is not restricted to the embodiment described above. Various modifications are possible without departing from the technical scope of the present invention. For example, the disk recording medium of the disk device is not restricted to an optical disk, such as an optic disk or a magneto-optic disk. It may also comprise a magnetic disk. Further, the combination camera/video-recorder system of the present invention is not restricted to a video-cam-corder. The present invention is also applicable to other types of image taking apparatus, such as electronic still cameras.

The combination camera/video-recorder system of the present invention, constructed as described above, provides the following advantages:

Since the built-in disk device is elastically supported by a plurality of insulators, a marked improvement can be achieved in terms of vibration-proofness and impact-proofness, whereby it is possible to prevent image information recorded from being destroyed by track deviation or the like as a result of vibrations or impacts generated during video recording, etc., thereby making it possible to realize highly accurate and highly reliably recording and reproduction.

Since both the position of the disk recording medium of the built-in disk device and the feeding direction of the pick-up are parallel to the optical axis of the photographic lens, the combination camera/video-recorder system is very resistant to the vibrations, impacts, etc. frequently applied in the vertical direction (the direction perpendicular to the optical axis) during video recording, whereby it is possible to prevent image information recorded from being destroyed by track deviation, etc. as a result of the vertical vibrations, impacts, etc. generated during the video recording, thereby making it possible to realize highly accurate and highly reliably recording and reproduction.

Further, since the insulators are equipped with spring elements and dashpot elements, it is possible to quickly absorb and attenuate vibrations, impacts, etc., whereby a marked improvement is achieved in vibration-proofness and impact-proofness.

Further, since the pick-up feeding mechanism has a contact structure in which the motor and the carriage are mechanically connected together, a marked improvement is achieved in vibration-proofness and impact-proofness regarding the longitudinal direction (the direction parallel to the optical axis).

Further, since there is provided a built-in disk device by means of which image information is recorded on an optical disk by an optical pick-up, it is possible to perform highly accurate and highly reliable recording and reproduction by a compact system.

What is claimed is:

1. A disk recording apparatus comprising:
    a camera main body equipped with a photographic lens and adapted to output image information in accordance with an optical image supplied through said photographic lens; and
    a disk device for recording on a recording track said image information on a disk recording medium,
    said disk device comprising:
        rotating means for rotating said disk recording medium around a first axis perpendicular to the optical axis of said photographic lens;
        an optical head means for producing a laser beam so as to record said image information on said disk recording medium; and
        moving means for moving said head along a second axis parallel to the optical axis of said photographic lens so as to enable said head to provide a laser beam over said disk recording medium to record said image information thereto in a horizontal reference line which is a radial line extending from the center of said disk recording medium which is parallel to the optical axis so that a recording track for recording on the horizontal reference line by the laser beam is along a vertical reference line which is perpendicular to the horizontal reference line wherein a spot of the laser beam only oscillates vertically along the recording track and substantially no track deviation of the spot of the laser beam is generated due to one of a plurality of insulators being mounted along an outer periphery of each of the side surfaces of said camera main body and wherein each of the insulators has an axis of deformation which intersects the axis of deformation of each of the other insulators at approximately the same location.

2. A disk recording apparatus according to claim 1, wherein the first axis of said rotating means is parallel to the horizontal direction of said camera main body.

3. A disk recording apparatus according to claim 2, wherein said camera main body has a shoulder pad.

4. A disk recording apparatus according to claim 2, wherein said moving means includes:
    a carriage holding said head means;
    a DC motor; and
    a coupling mechanism for transmitting the rotation of said DC motor mechanically to said carriage.

5. A disk recording apparatus according to claim 1, wherein said disk recording medium is an optical disk, and wherein said head is an optical pickup.

6. A disk recording apparatus according to claim 5, wherein said optical pick-up includes:
    an objective lens; and
    said biaxial mechanism for holding said objectives lens.

7. A disk recording apparatus according to claim 6, wherein said biaxial mechanism is a balanced type.

8. A disk recording apparatus according to claim 6, wherein said biaxial mechanism is an unbalanced type which is equipped with a block and a plurality of leaf springs each having one end fastened to said block and the other end holding said objective lens, and
    wherein the longitudinal direction of said plurality of leaf springs is matched with the vertical direction of said main body.

9. A disk recording apparatus according to claim 1, further comprising a plurality of insulators elastically supporting said disk inside said camera main body.

10. A disk recording apparatus comprising:
    a camera main body equipped with a photographic lens and adapted to output image information in accordance with an optical image supplied through said photographic lens;
    a disk device for recording on a recording track said image information on a disk recording medium from a laser beam, said disk device having an outer periphery formed of six side surfaces; and
    a plurality of insulators which are mounted in the camera main body and support said disk device inside said camera main body so that the load of the disk device is directly applied to the plurality of insulators, and whereby each insulator of said plurality of insulators elastically supports the outer periphery of only one of the six side surfaces of said disk device and only one of said plurality of insulators elastically supports the corresponding side surface of the six side surfaces supported thereby whereby each of said plurality of insulators is placed at a predetermined position wherein each of the insulators has an axis of deformation which intersects the axis of deformation of each of the other insulators at approximately the same location so that substantially no track deviation of a spot of a laser beam occurs which only oscillates vertically along the recording track.

11. A disk recording apparatus according to claim 10, wherein said plurality of insulators include spring elements and dashpot elements.

12. A disk recording apparatus according to claim 10, wherein said plurality of insulators are provided between the lower surface of said camera main body and the upper surface of said disk device, between the upper surface of said camera main body and the lower surface of said disk device, and between a side surface of said camera main body and a side surface of said disk device.

13. A disk recording apparatus according to claim 12, wherein, of said plurality of insulators, those insulators which are provided between the lower surface of camera main body and the upper surface of said disk device have only either spring elements or dashpot elements, and wherein the insulators provided at the other positions have been both spring elements and dashpot elements.

* * * * *